(12) United States Patent
Hall et al.

(10) Patent No.: US 10,919,744 B2
(45) Date of Patent: Feb. 16, 2021

(54) FIFTH WHEEL HITCH LIFTING APPARATUS

(71) Applicant: Hall Labas, LLC, Provo, UT (US)

(72) Inventors: David R. Hall, Provo, UT (US); Doug Mecham, Provo, UT (US); Casey Webb, Spanish Fork, UT (US)

(73) Assignee: Hall Labs LLC, Provo, UT (US)

( * ) Notice: Subject to any disclaimer, the term of this patent is extended or adjusted under 35 U.S.C. 154(b) by 8 days.

(21) Appl. No.: 16/407,177

(22) Filed: May 8, 2019

(65) Prior Publication Data

US 2020/0354203 A1    Nov. 12, 2020

(51) Int. Cl.
| | |
|---|---|
| *B66D 1/60* | (2006.01) |
| *B66D 1/12* | (2006.01) |
| *B62D 53/08* | (2006.01) |
| *B66D 1/48* | (2006.01) |

(52) U.S. Cl.
CPC ............... *B66D 1/60* (2013.01); *B62D 53/08* (2013.01); *B66D 1/12* (2013.01); *B66D 1/485* (2013.01); *B66D 2700/0141* (2013.01); *B66D 2700/026* (2013.01)

(58) Field of Classification Search
CPC .... B66D 1/60; B66D 3/20; B66D 2700/0183; B66C 23/04; B66C 23/18; B66C 23/20; B66C 23/38; B66C 23/44; B66C 23/64; B62D 53/08; B62D 65/00
See application file for complete search history.

(56) References Cited

U.S. PATENT DOCUMENTS

| | | | | |
|---|---|---|---|---|
| 4,127,299 | A * | 11/1978 | Blair | B60P 3/32 296/164 |
| 4,881,864 | A * | 11/1989 | Amato | B60R 9/06 414/543 |
| 5,085,408 | A * | 2/1992 | Norton | B60P 3/1033 254/325 |
| 5,105,349 | A * | 4/1992 | Falls | F21V 21/38 248/329 |
| 5,888,043 | A * | 3/1999 | Jatcko | B66C 1/66 414/459 |
| 7,503,549 | B2 * | 3/2009 | Maturino | B62D 53/08 254/336 |
| 7,594,641 | B2 * | 9/2009 | Sharp | B66C 23/36 254/325 |

(Continued)

FOREIGN PATENT DOCUMENTS

GB    2468735 A  *  9/2010  ............... B66D 3/08

*Primary Examiner* — Emmanuel M Marcelo

(57) ABSTRACT

An apparatus for lowering a hitch onto a truck bed and raising the hitch off of a truck bed is disclosed. The apparatus includes: an upper carriage, a lower carriage, and a kingpin. The upper carriage is suspended from multiple lines, which lines are configured to lower and raise the upper carriage. The lower carriage is attachable to the upper carriage at various positions relative to the upper carriage to allow the load on the lines to be balanced in one direction. The kingpin is attached to the lower carriage, and kingpin is configured to be captured by the hitch. Allowing the hitch to be lowered onto the truck bed and raised off of the truck bed as the upper carriage and the lower carriage are lowered and raised by the lines. Another embodiment of the apparatus includes lifting devices attached to the lines for raising and lowering the hitch.

20 Claims, 7 Drawing Sheets

(56) References Cited

U.S. PATENT DOCUMENTS

| | | | |
|---|---|---|---|
| 9,434,583 B1* | 9/2016 | Holttum | B62D 53/0828 |
| 2002/0060442 A1* | 5/2002 | Andersen | B60D 1/28 |
| | | | 280/416.1 |
| 2013/0181426 A1* | 7/2013 | Cote | B60D 1/36 |
| | | | 280/425.1 |

* cited by examiner

FIFTH WHEEL HITCH LIFTING APPARATUS

TECHNICAL FIELD

This invention relates generally to the field of storage, and more specifically to overhead storage.

BACKGROUND

Recreational vehicles are a popular method of vacationing and visiting new locales. A "fifth wheel" is one type of recreational vehicle. The "fifth wheel" is a popular type of recreational vehicle in part because of the practicality of the design. A fifth wheel trailer is generally pulled behind a pickup truck. By detaching the pickup truck from the fifth wheel trailer the pickup truck can function on its own. This design is beneficial both when visiting a new locale and when the fifth wheel has returned home.

The fifth wheel attaches to the pickup truck with a mount or hitch located in the bed of the pickup truck. These hitches are by necessity heavy and cumbersome. Additionally, the bed of the pickup truck is often modified to accommodate the hitch. These factors often lead to the result that fifth wheel owners leave the hitch in the bed of their pickup truck. The disadvantage to leaving the hitch in the bed of the pickup truck is that the capacity of the bed becomes diminished and less useable. Furthermore, when the fifth wheel is detached, and the hitch is in the bed of the pickup truck, the hitch is exposed to the elements which can lead to degradation of the hitch.

SUMMARY

In a first aspect, the disclosure provides an apparatus for lowering a hitch onto a truck bed and raising the hitch off of a truck bed. The apparatus includes: an upper carriage, a lower carriage, and a kingpin. The upper carriage is suspended from multiple lines, which lines are configured to lower and raise the upper carriage. The lower carriage is attachable to the upper carriage at various positions relative to the upper carriage to allow the load on the lines to be balanced in one direction. The kingpin is attached to the lower carriage, and kingpin is configured to be captured by the hitch. Allowing the hitch to be lowered onto the truck bed and raised off of the truck bed as the upper carriage and the lower carriage are lowered and raised by the lines.

In a second aspect, the disclosure provides an apparatus for lowering a hitch onto a truck bed and raising the hitch off of a truck bed. The apparatus includes: an upper carriage, lifting devices, a lower carriage, and a kingpin. The upper carriage is suspended from multiple lines, which lines are attached to lifting devices. Each lifting device includes: a drum for winding and unwinding a line, a motor and transmission coupled to the drum to apply a torque thereto, a guide to direct the line onto the drum, and a controller. The lifters are configured to lower and raise the upper carriage. The lower carriage is attachable to the upper carriage at various positions relative to the upper carriage to allow the load on the lines to be balanced in one direction. The kingpin is attached to the lower carriage and is configured to be captured by the hitch. This allows the hitch to be lowered onto the truck bed and raised off of the truck bed as the upper carriage and the lower carriage are lowered and raised by the lines.

Further aspects and embodiments are provided in the foregoing drawings, detailed description and claims.

BRIEF DESCRIPTION OF THE DRAWINGS

The following drawings are provided to illustrate certain embodiments described herein. The drawings are merely illustrative and are not intended to limit the scope of claimed inventions and are not intended to show every potential feature or embodiment of the claimed inventions. The drawings are not necessarily drawn to scale; in some instances, certain elements of the drawing may be enlarged with respect to other elements of the drawing for purposes of illustration.

DETAILED DESCRIPTION

Figure 1:
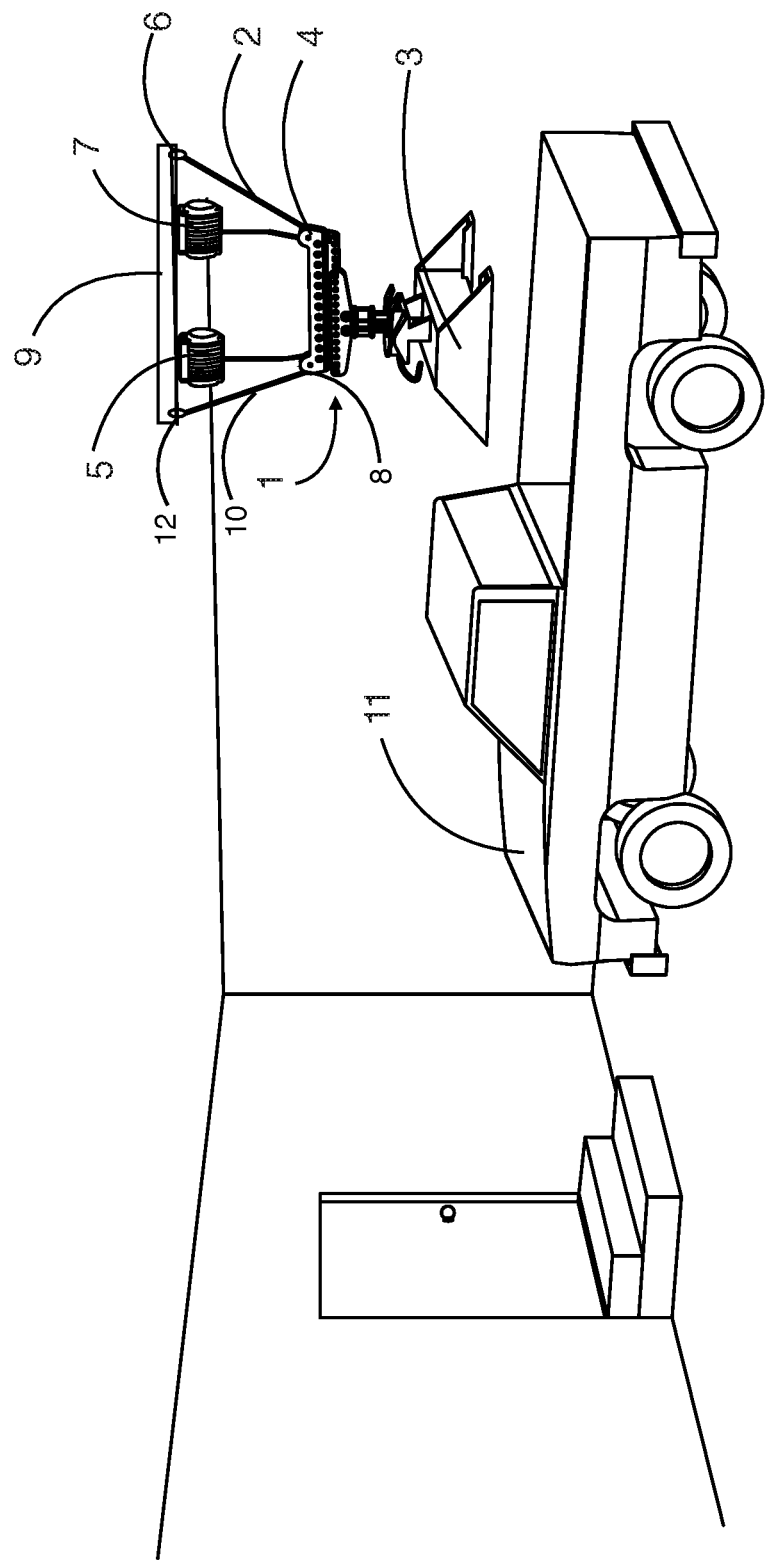
FIG. 1 is an embodiment of the apparatus lifting a hitch from a truck.

The following description recites various aspects and embodiments of the inventions disclosed herein. No particular embodiment is intended to define the scope of the invention. Rather, the embodiments provide non-limiting examples of various compositions, and methods that are included within the scope of the claimed inventions. The description is to be read from the perspective of one of ordinary skill in the art. Therefore, information that is well known to the ordinarily skilled artisan is not necessarily included.

Definitions

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

As used herein, "fifth wheel hitch" is meant to refer to a hitch used to secure a "fifth wheel" trailer to a truck.

As used herein, "mobile device" is meant to refer to mobile general-purpose processing devices, such as a smartphone, tablet, or laptop.

As used herein, the term "balance" or "balanced" is mean to refer to the condition wherein the load of the fifth wheel hitch is somewhat leveled, or horizontal in at least one plane. A perfect balance is not required, but the more horizontal the hitch is, the easier it is to lower it and attach it in the truck bed. Preferably, the hitch is balanced so that it is less than 40 degrees off of horizontal, more preferably, less than 20 degrees and most preferably less than 10 degrees. As explained below, the apparatus balances the hitch in at least one direction. Preferably, the apparatus balances the hitch in both directions, in other words, side to side as well as front to back.

The fifth wheel hitch generally sits in and attaches to the bed of a pickup truck. Often the bed of the truck needs to be modified so the hitch will attach to and stay in the bed of the truck. These modifications can include cutting the bottom of the bed of the pickup truck, drilling holes for bolts in the bottom of the bed of the pickup truck, and attaching clips or other fasteners. The hitch is often very heavy. These factors make it nearly impossible for a single person to remove or attach a fifth wheel hitch.

Now referring to FIG. 1, a fifth wheel hitch 3 is attached to a lifting apparatus 1. The fifth wheel hitch 3 is being raised from the bed of truck 11. Two lifting devices 5 and 7 are attached to an overhead mounting system 9 (such as that described in U.S. Pat. No. 9,939,105, the contents of which are incorporated herein by reference). Each of the lifting devices include a line, for example line 2, connected to lifting device 7. The line 2 engages a pulley 4 on the lifting apparatus 1. Pulley 4 is attached to the back end of the lifting device. The line 10 engages a pulley 8 on the lifting apparatus 1. Pulley 8 is attached to the front end of the lifting device. By utilizing pulleys, the force necessary to raise the fifth wheel hitch is reduced. This creates less wear on the lifting devices and can extend their usable life. The line 2 engages pulley 4 and the end of the line 2 is attached to the overhead mounting system by a carabiner 6. The line 10 engages a pulley 8 and the end of the line 10 is attached to the overhead mounting system by a carabiner 12. In other embodiments, the lines are attached to the overhead mounting system by bins, bolts, screws, or other attachment mechanisms. The carabiners 6 and 12 allow the lines 2 and 12 to be easily moveable and removable. The overhead mounting system is designed to allow the end of the lines 2 and 10 to be placed at various points along the overhead mounting system. In other embodiments, the end of the lines attach to the lifting apparatus directly. In such an embodiment, the pulleys are not used and the lifting devices lift the full weight of the lifting apparatus and attached hitch. In some embodiments, the line is attached to the lifting apparatus by bolts, pins, screws, or other attachment mechanisms.

Generally, fifth wheel hitches are quite heavy. The overhead mounting system 9 is designed to deal with heavy loads and is quite strong. In some embodiments, the overhead mounting system 9 has been adapted to enable it to support even heavier loads. In these strengthened embodiments, the channels of the overhead mounting system have been thickened and lengthened. The longer length of the channels allows them to be secured to more beams in the ceiling, enabling them to hold heavier loads. The thicker material of the channel adds strength and carrying capacity. The lifting devices 5 and 7 function together to enable raising and lowering of the fifth wheel hitch.

Figure 2:
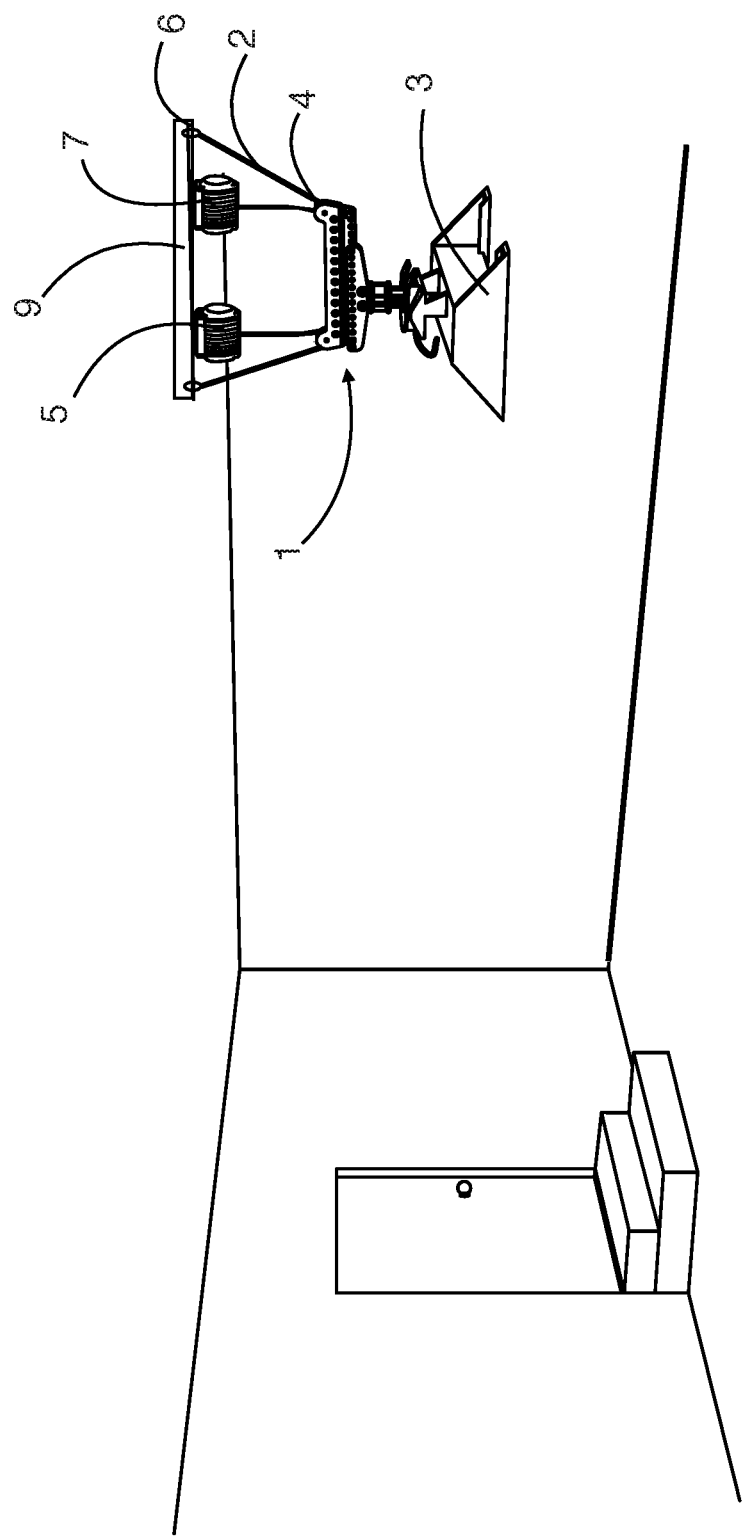
FIG. 2 is an embodiment of the apparatus storing a hitch.

FIG. 2 shows the fifth wheel hitch being stored. The lifting devices 5 and 7 have raised the hitch 3 to a suitable storage height. In most embodiments, this will be high enough for a person to walk underneath the hitch 3.

Figure 3:
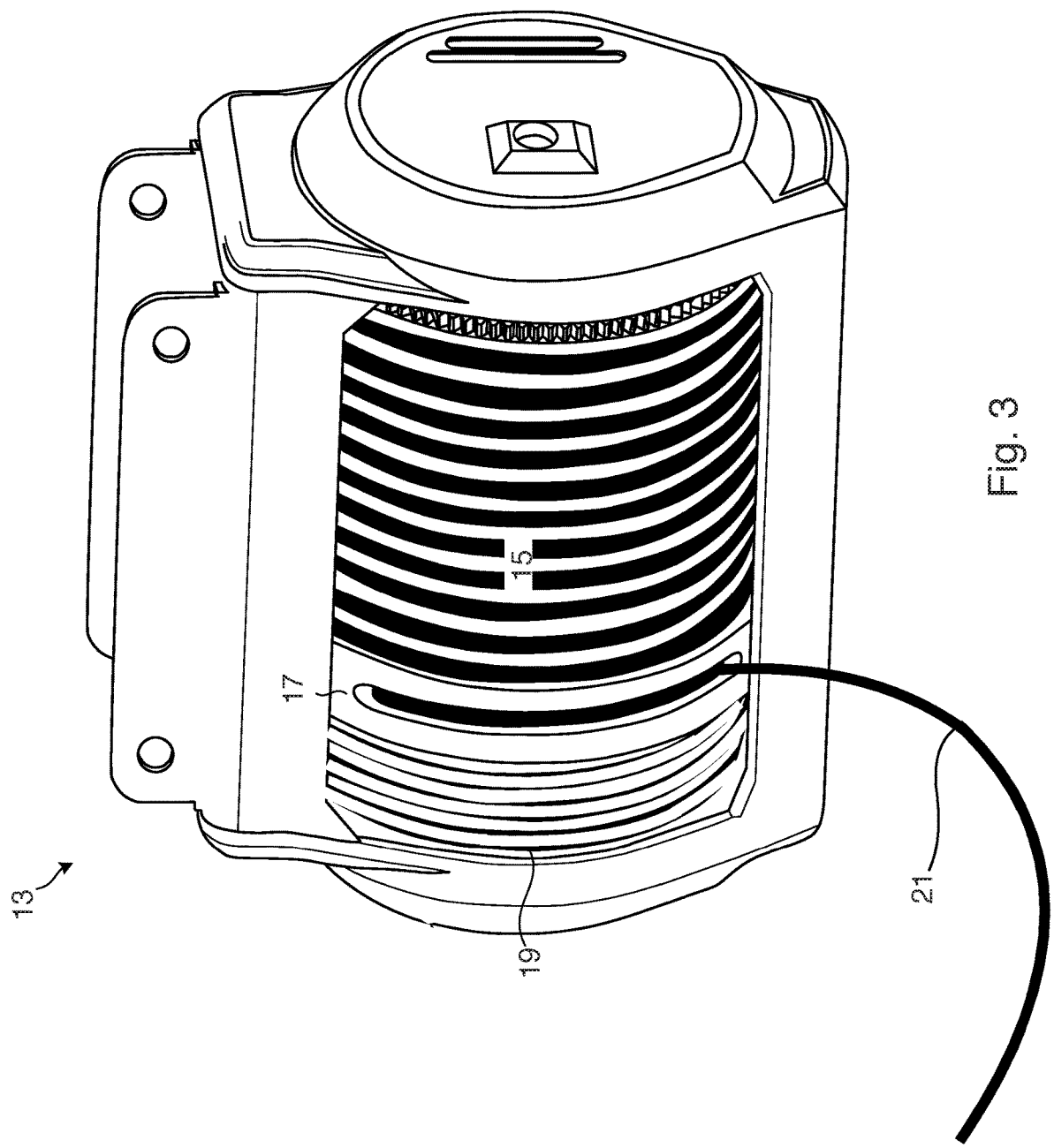
FIG. 3 is an embodiment of a lifting device.

FIG. 3 shows a lifting device. The preferred lifting device is one of the lifting devices described in U.S. Pat. Nos. 9,399,566, 9,567,194, 9,873,600, 9,908,754, 9,988,250, 9,975,745, 9,988,251 the entire contents of which are incorporated herein by reference. These lifting devices are available from GarageSmart under the brand "MyLifter®." A simplified description of one such lifting device follows. The lifting device 3 has a grooved drum 19 on which a line 21 is wound. The lifting device also includes a guide 17 for winding the line on the drum. The drum 15 of the lifting device spools and unspools the line 21. The motor and transmission are located within the drum. The lifting device is also equipped with a controller. Preferably, the controller is assembled on a printed circuit board (PCB) and includes a wireless transmitter, a processor and memory. The wireless transmitter of the controller connects the lifting device to a mobile device. The mobile device is configured to run an app for controlling the lifting device. Through the app the controller causes the motor to turn the drum. As the drum turns in one direction, the line unspools from the drum of the lifting device. As the drum spools in the other direction, the line spools onto the drum of the lifting device.

To enable the fifth wheel hitch to be raised and lowered in a level manner, the lifting devices need to coordinate their actions so that they spool their lines in at the same speed. The lifting devices are programmed with certain functionalities as to enable the lifting devices to function as a group (such as those described in U.S. Pat. No. 10,280,051, the contents of which are incorporated by reference).

A summary of such functionalities follows. Multiple motorized lifting devices are configured to raise and lower a shared load, such as a fifth wheel hitch. When using multiple synchronizing motorized lifting devices to lift a shared load, apparatus and methods are needed to ensure that the motorized lifting devices stay synchronized. For example, if one motorized lifting device were to stop while the other motorized lifting devices continued raising or lowering, the hitch could tip, potentially creating a safety hazard. A similar situation could occur if some motorized lifting devices were to move faster or slower than others.

In certain embodiments, a grouping module is used to group motorized lifting devices for synchronized operation and a synchronization module is used to keep the group of motorized lifting devices synchronized with one another. Once grouped, the motorized lifting devices operate as a single device.

In certain embodiments, the grouping module and synchronization module are implemented in the motorized lifting devices. In other embodiments, the grouping module and synchronization module are implemented in a controller which will be discussed later. In other embodiments, the grouping and synchronization modules are distributed between the controller and the motorized lifting devices. In general, the synchronization module monitors the operating parameters (position of the line, speed, etc.) of the motorized lifting devices in the group and adjust the operating parameters to keep the motorized lifting devices substantially synchronized.

In certain embodiments, a synchronization module in accordance with the invention is configured to identify a slowest moving motorized lifting device in a group and then adjust the other motorized lifting devices in the group to keep pace with the slowest motorized lifting device. For example, when the group of motorized lifting devices is lifting a hitch and the synchronization module detects (by requesting or periodically receiving data, etc.) that one of the motorized lifting devices in the group is raising or lowering the load slower than the others the synchronization module adjusts (by sending commands, etc.) the speed of the other motorized lifting devices to match the speed of the slowest motorized lifting device. Similarly, if the synchronization module detects that an amount of line let out from each of the motorized lifting devices is causing the fifth wheel hitch tilt, the synchronization module adjusts the amount of line let out from each of the motorized lifting devices to level out the hitch. Similarly, if the synchronization module detects that one of the motorized lifting devices has stopped (due, for example, to a power outage or an overload condition) or loss of communication, the synchronization module causes the other motorized lifting devices to stop, thus maintaining the hitch level to prevent safety hazards.

As previously mentioned, the motorized lifting devices are configured to raise or lower a fifth wheel hitch. Various controls may be provided with the motorized lifting devices to enable a user to lift or lower the hitch. For example, in many embodiments, the controls provide a "lift" and "lower" button that when pressed causes an end of the line to go up and down respectively.

It will generally be more desirable for the motorized lifting devices to establish various set points for the motorized lifting devices and have the motorized lifting devices automatically stop at these set points as it raises or lowers the fifth wheel hitch. For example, it would be useful to establish stopping points such as: when the hitch is at a safe height, and when the hitch is resting on the truck bed. In certain embodiments, the user establishes the set points by raising or lowering the line and selecting an option to store or remember the position of the line at each stop. Once the set points are established, a user presses a "smart lift" or "smart lower" button to cause the motorized lifting devices to raise or lower the line to the next set point, without requiring the user to hold down the button or be present.

Figure 4:
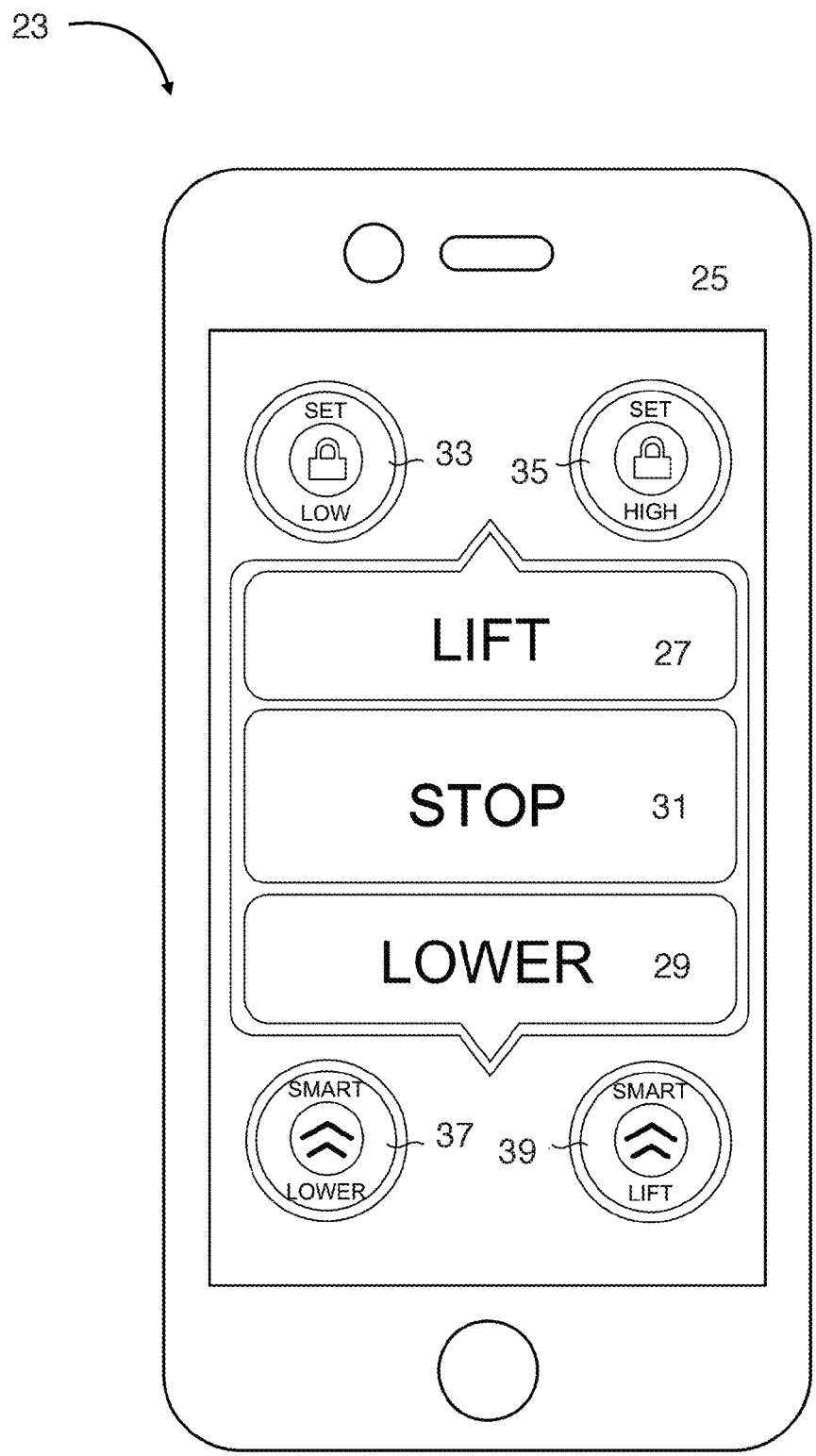
FIG. 4 is an embodiment of a control device.

Referring to FIG. 4, one embodiment of a controller for performing the functions such as raising and lowering is depicted. In this example, such a controller is embodied as an application executing on a smartphone 23. In other embodiments the application is executed on other mobile general-purpose processing devices, such as a tablet, or laptop. As shown in FIG. 4, in certain embodiments, the application includes a user interface 25 providing various controls. It is possible for a user interface to take on many forms and thus is presented by way of example and not limitation. It should be recognized that the user interface 25 often includes other pages, windows, menus, or the like, and thus is not intended to reflect the complete functionality of the application.

In certain embodiments, the user interface 25 includes one or more of the following virtual buttons for operation by a user: a "lift" button 27, a "lower" button 29, and a "stop" button 31. Pressing the "lift" button 27 causes the motorized lifting devices to raise the line until the button is released or until the line reaches an upper limit or stop point. Similarly, pressing the "lower" button 29 causes the motorized lifting devices to lower the line until the button is released or the line reaches a lower limit or stop point. Pressing the "stop" button 31 causes the motorized lifting devices to stop.

The depicted user interface 25 also includes buttons that enable the motorized lifting devices to function in a more intelligent manner. For example, the user interface 25 includes functionality enabling a user to establish various set points for the motorized lifting devices and have the motorized lifting devices automatically stop at these set points as it raises or lowers the fifth wheel hitch. For example, a "set low" button 33 establishes a low set point at a user determined location of the line. Generally, this low set point will be at the point where the hitch is resting on the bed of the truck. When the line is at desired location the user presses and holds the set low button, thus establishing the set low location. This location can be "locked" so that the location is not accidentally reset. Similarly, a "set high" button 35 establishes a high set point at a user determined location of the line. When the line is at desired location the user presses and holds the set high button, thus establishing the set high location. This location can be "locked" so that the location is not accidentally reset.

A "smart lower" button 37 causes the motorized lifting device to lower the line until it reaches the low set point and a "smart lift" button 39 causes the motorized lifting device to raise the line until it reaches the high set point. In other embodiments, the user interface 25 is configured to enable a user to establish other intermediate set points in addition to the high and low set points. Unlike the "lift" button 27 and the "lower" button 29, a user is not be required to hold down the "smart lower" button 27 or "smart lift" button 29 to perform the associated functions.

Figure 5:
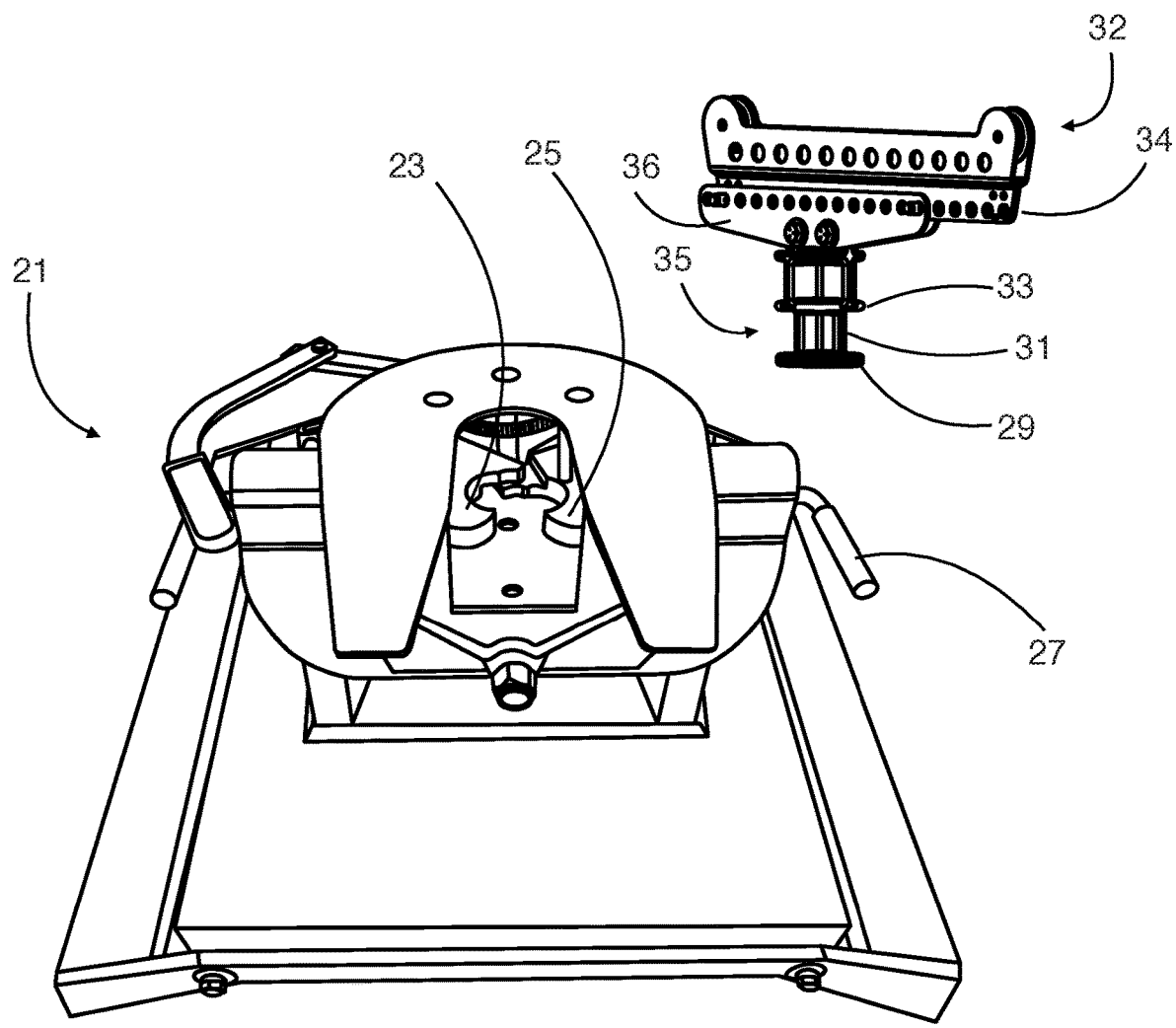
FIG. 5 is an embodiment showing the apparatus with a fifth wheel hitch.

Referring to FIG. 5, the fifth wheel hitch lifting apparatus is designed so that a hitch can be lifted from the bed of a truck by a lifting device and raised to an overhead position. Once in the overhead position the fifth wheel hitch can be stored in this raised position. It is therefore important that the hitch securely attaches to the lifter. A fifth wheel hitch includes a locking mechanism for securing the hitch to a kingpin such as modified kingpin 35. The locking mechanism includes jaws 23 and 25 which fit around the shaft 31 of the modified kingpin 35. It is important that the hitch 21 not slide off the modified kingpin 35. The modified kingpin 35 therefore includes base plate 29. The base plate 29 is designed to hold the hitch 21 on the modified kingpin 35. The lever 27 on hitch 21 locks and unlocks the jaws 23 and 25.

In one embodiment, the upper carriage 34 is secured to the lower carriage 36. Preferably, the upper carriage 34 will be secured to the lower carriage 36 by pins. Alternatively, bolts or screws are used to secure the upper and lower carriages together. In this embodiment, the lifting apparatus is only adjustable in a single axis. The upper carriage 34 and the lower carriage 36 are aligned parallel to each other. The upper carriage 34 is oriented so that the long axis of the upper carriage 34 is in alignment with the truck. In this embodiment, aligning the upper and lower carriages enables the fifth wheel lifting apparatus to balance in a single plane. By moving the upper carriage 34 and the lower carriage 36 relative to each other the balance of the fifth wheel hitch attached to the fifth wheel lifting apparatus is adaptable to allow the fifth wheel hitch to hang in a level condition. In this embodiment, the level condition is level relative to the upper and lower carriages as they are repositioned relative to each other. Generally, this will be in the forward and backward direction of the truck.

Figure 6:
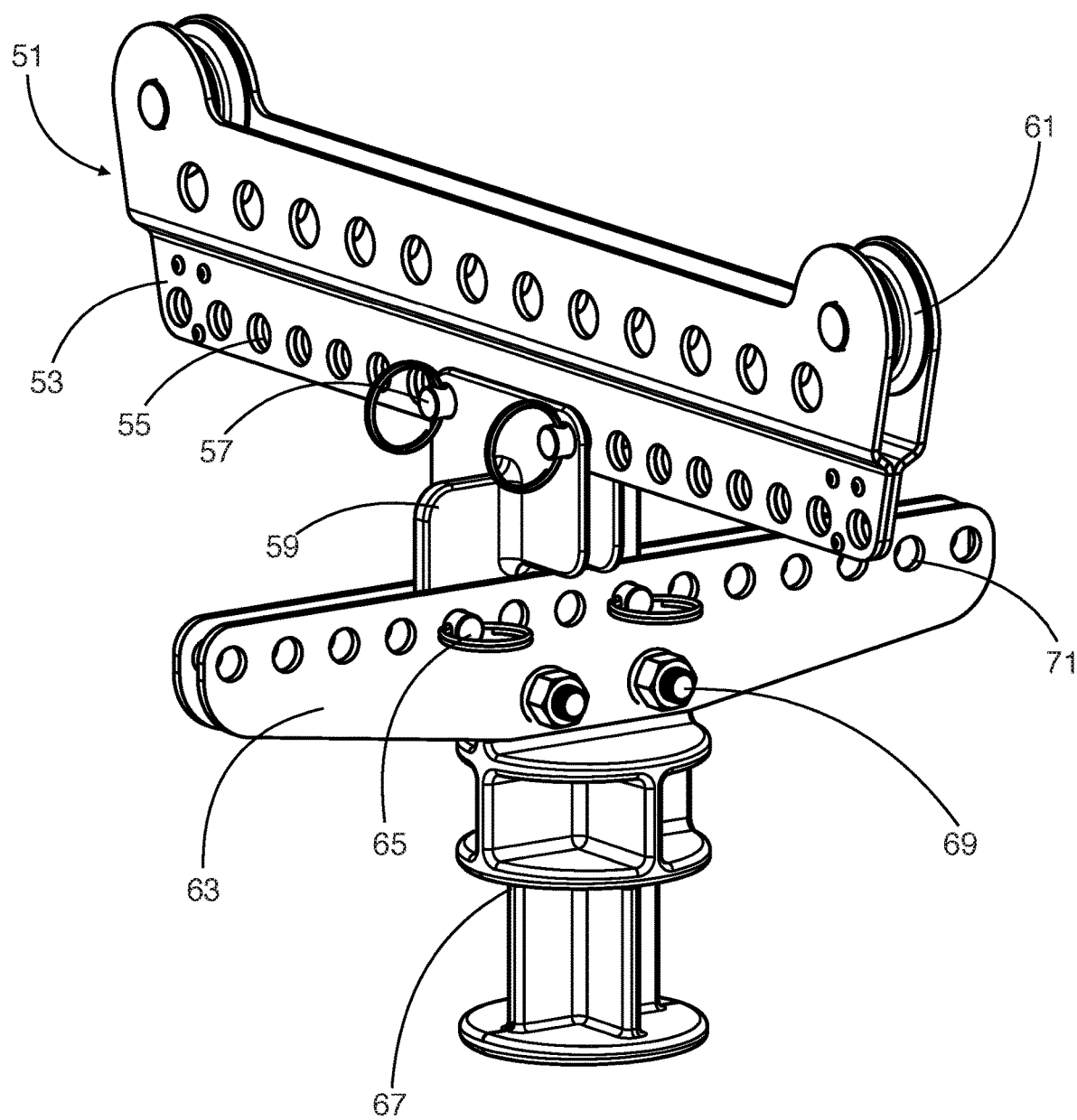
FIG. 6 is an embodiment of the fifth wheel hitch lifting apparatus.
Figure 7:
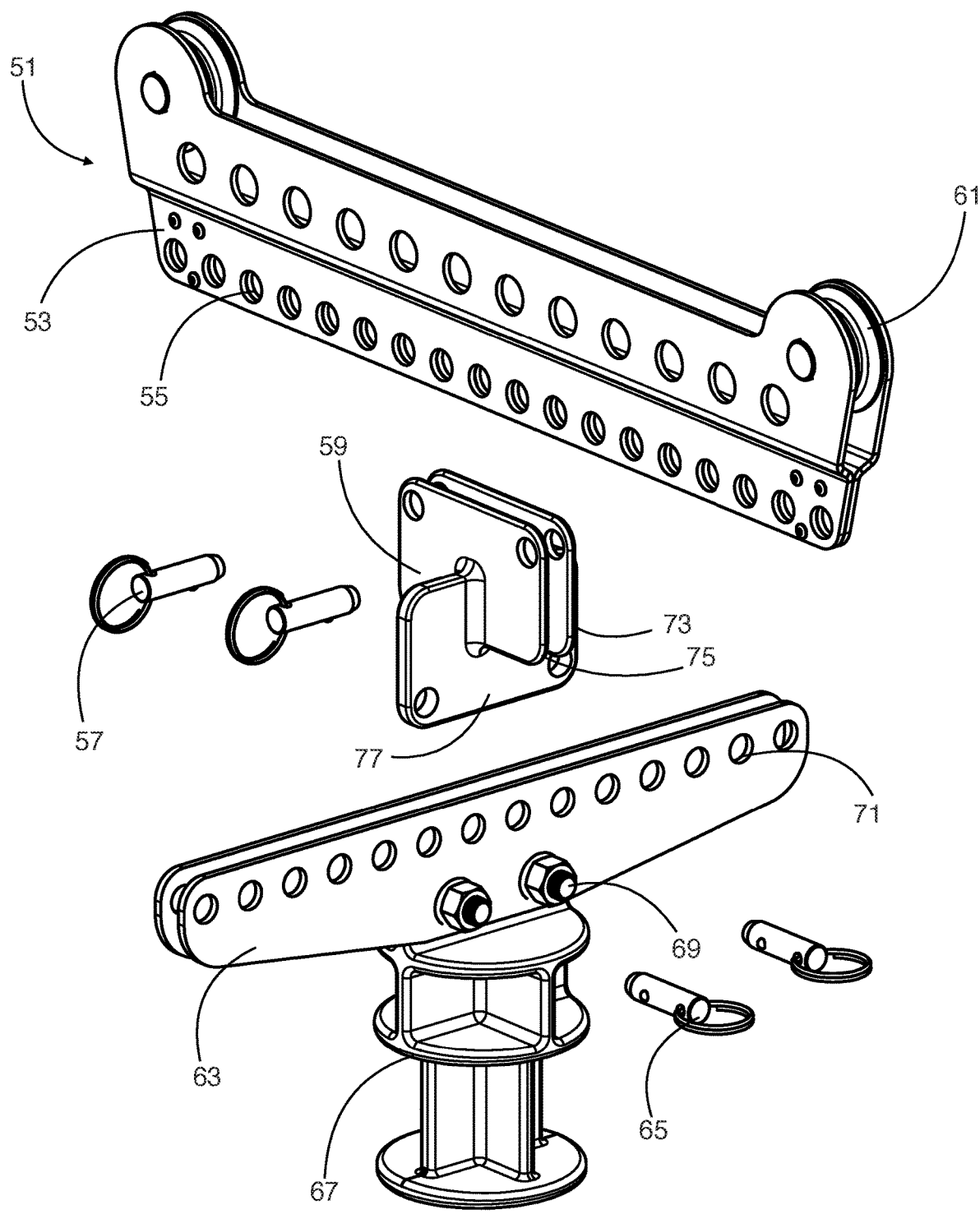
FIG. 7 is an embodiment showing an exploded view of the fifth wheel hitch lifting apparatus.

FIGS. 6 and 7 show how the fifth wheel hitch lifting apparatus attach together. They also show the adjustment mechanisms to allow the fifth wheel hitch to hang in a level condition. The carriage 51 of the lifting apparatus attaches the lifting apparatus to the lifting devices. In the preferred embodiment the carriage includes pulleys such as pulley 61. The pulleys decrease the amount of force necessary to raise the apparatus and the hitch. In other embodiments the lifting devices attach to the carriage with bolts or pins. The carriage 51 includes an upper carriage 53. In most embodiments, the upper carriage includes pulleys, such as pulley 61. Generally, the upper carriage 53 is oriented so that one of the pulleys of the upper carriage is toward the front of the truck and the other pulley is toward the rear of the truck. The upper carriage 53 contains holes such as the hole 55 which enable the position adjustment connector 59 to move position along the length of the upper carriage 53. Preferably, the position adjustment connector 59 is secured to the upper carriage 53 by removable pins, such as pin 57. The upper carriage 53 slides between the upper plates of the position adjustment connector 59. The two plates also have holes that correspond to the holes in the upper carriage 53. The position adjustment connector 59 is positioned along the length of the upper carriage 53. Pins are inserted through the upper carriage 53 and through the upper plates 73 and 75 of the position adjustment connector 59. The carriage 51 is thus securely attached to the position adjustment connector 59.

The position adjustment connector 59 also attaches to the lower carriage 63. The lower plate 77 of the position adjustment connector 59 slides into the lower carriage 63. The position adjustment connector 59 is adjustable along the length of the lower carriage 63. Preferably, Pins, such as pin 65 are used to secure the position adjustment connector 59 to the lower carriage. In other embodiments, bolts, rivets, or screws are used. The position adjustment connector 59 allows for adjustment along two axis. Being adjustable in two axis's enables the fifth wheel hitch to achieve a more level orientation.

The position adjustment connector 59 enables the upper carriage 53 and the lower carriage 63 to be repositioned relative to each other. Adjusting the position of the upper carriage relative to the lower carriage allows the fifth wheel hitch lifting apparatus to balance the load of the fifth wheel hitch. As the load of the fifth wheel hitch is balanced, the fifth wheel hitch will hang in a relatively level condition. In many embodiments, the position adjustment connector 59 adjusts the balance of the fifth wheel hitch relative to the long axis of the truck bed, or front to back, by changing its position along the upper carriage. The balance of the fifth wheel hitch relative to the short axis of the truck bed, or side to side, is generally adjusted by changing the position of the position adjustment connector 59 along the lower carriage. It is possible that several adjustments must be made to achieve a level condition. Typically, the fifth wheel hitch lifting apparatus will only need to be balanced one time. Once the balance for the fifth wheel hitch has been established it will not need to be adjusted. There are events that could change the distribution of weight in the fifth wheel hitch itself and thus the balance of the fifth wheel hitch. These events include accidents and dropping of the fifth wheel hitch. The fifth wheel hitch lifting apparatus would then need to be adjusted to account for the change in the weight distribution.

The lower carriage 63 is also attached to the modified kingpin 67. In the preferred embodiment, the modified kingpin 67 is attached with bolts, such as bolt 69, to the lower carriage 63. In other embodiments, the kingpin is attached with pins, screws, rivets, or by welding the modified kingpin 67 to the lower carriage 63.

In an alternative embodiment, the upper carriage 53 is secured directly to the lower carriage 63 eliminating the position adjustment connector 59. In this alternative embodiment, the lifting apparatus is only adjustable in a single axis.

In another alternative embodiment, the lower carriage is also designed to attach to lifting devices. In some embodiments, the lines of the lifting devices will attach with bolts or pins. In other embodiments the lifting devices will engage the line of the lifting devices with pulleys.

Fifth wheel hitches are designed to withstand pulling large and heavy trailers and are thus made from durable long-lasting materials. These materials often result in heavy hitches. The lifting devices need to be capable of lifting heavy loads to raise the hitches and store them overhead. The lifting apparatus needs to be as light-weight as possible to mitigate the load on the lifters. However, the lifting apparatus must also be strong enough to hold up to the weight of the hitch. Preferably, the lifting apparatus is made from metal. More preferably, that metal is steel. Most preferably the steel is powder coated. Alternatively, the lifting apparatus is made from other metals such as aluminum, anodized aluminum, titanium or composite materials such as plastics or carbon fiber. The pins and bolts are also preferably made from steel.

As can be seen in FIGS. 6 and 7 certain weight reducing steps have been taken. For example, the modified kingpin has been designed to reduce its weight. Instead of being formed as solid metal cylinders the shafts of the modified kingpin are formed into a cross or an x. Additionally, the carriage 51 has been designed with weight reducing holes. The holes for securing the position adjustment connector 59 to the upper and lower carriages such as hole 55 in the upper carriage 53 and the hole 71 in the lower carriage, also reduce the weight of the lifting apparatus.

All patents and published patent applications referred to herein are incorporated herein by reference. The invention has been described with reference to various specific and preferred embodiments and techniques. Nevertheless, it is understood that many variations and modifications may be made while remaining within the spirit and scope of the invention.

What is claimed is:

1. An apparatus for lowering a hitch onto a truck bed and raising the hitch off of a truck bed comprising:
    an upper carriage suspended from multiple lines, which lines are configured to lower and raise the upper carriage;
    a lower carriage attachable to the upper carriage at various positions relative to the upper carriage to allow the load on the lines to be balanced in one direction;
    a kingpin attached to the lower carriage, which kingpin is configured to be captured by the hitch, thereby allowing the hitch to be lowered onto the truck bed and raised off of the truck bed as the upper carriage and the lower carriage are lowered and raised by the lines.

2. The invention of claim 1, wherein the upper carriage is elongate and orientated generally from a front of a truck to a back of the truck, with one of the multiple lines attached to a front end of the upper carriage and another of the multiple lines attached to a back end of the upper carriage.

3. The invention of claim 2, wherein the lower carriage is also elongate and oriented generally parallel to the upper carriage, and wherein one of the upper carriage and the lower carriage comprises a series of holes along its body, whereby the other of the upper carriage and the lower carriage can be attached at different points with pins passing through at least two of the holes.

4. The invention of claim 3, wherein both the upper carriage and the lower carriage comprises at least four holes through which the pins can be inserted.

5. The invention of claim 1, further comprising a position adjustment connector comprising an upper component that attaches to the upper carriage and a lower component that attaches to the lower carriage, and wherein the lower component is attachable to the upper component at various positions relative to the upper component, thereby allowing the load on the lines to be balanced in another direction.

6. The invention of claim 5, wherein the upper carriage and the lower carriage are elongate and oriented generally parallel to each other, and wherein one of the upper carriage and the lower carriage comprises a series of holes along its body, whereby the other of the upper carriage and the lower carriage can be attached at difference points with pins passing through at least two of the holes.

7. The invention of claim 6, wherein the one direction is generally from a front of a truck to a back of the truck and the other direction is generally from one side of the truck to the other.

8. The invention of claim 5, wherein the other direction is perpendicular to the one direction.

9. The invention of claim 1, wherein the lines are attached to the upper carriage by pulleys to provide a mechanical advantage.

10. An apparatus for lowering a hitch onto a truck bed and raising the hitch off of a truck bed comprising:
an upper carriage suspended from multiple lines, which lines are attached to lifting devices, each lifting device comprising:
a drum for winding and unwinding a line;
a motor and transmission coupled to the drum to apply a torque thereto;
a guide to direct the line onto the drum; and
a controller;
configured to lower and raise the upper carriage;
a lower carriage attachable to the upper carriage at various positions relative to the upper carriage to allow the load on the lines to be balanced in one direction;
a kingpin attached to the lower carriage, which kingpin is configured to be captured by the hitch, thereby allowing the hitch to be lowered onto the truck bed and raised off of the truck bed as the upper carriage and the lower carriage are lowered and raised by the lines.

11. The invention of claim 10, wherein the upper carriage is elongate and orientated generally from a front of a truck to a back of the truck, with a first line attached to a front end of the upper carriage and a second line attached to a back end of the upper carriage.

12. The invention of claim 11, wherein the lower carriage is also elongate and oriented generally parallel to the upper carriage, and wherein one of the upper carriage and the lower carriage comprises a series of holes along its body, whereby the other of the upper carriage and the lower carriage can be attached at different points with pins passing through at least two of the holes.

13. The invention of claim 12, wherein both the upper carriage and the lower carriage comprises at least four holes through which the pins can be inserted.

14. The invention of claim 10, further comprising a position adjustment connector comprising an upper component that attaches to the upper carriage and a lower component that attaches to the lower carriage, and wherein the lower component is attachable to the upper component at various positions relative to the upper component, thereby allowing the load on the lines to be balanced in another direction.

15. The invention of claim 14, wherein the upper carriage and the lower carriage are elongate and oriented generally parallel to each other, and wherein one of the upper carriage and the lower carriage comprises a series of holes along its body, whereby the other of the upper carriage and the lower carriage can be attached at difference points with pins passing through at least two of the holes.

16. The invention of claim 14, wherein the other direction is perpendicular to the one direction.

17. The invention of claim 16, wherein the one direction is generally from a front of a truck to a back of the truck and the other direction is generally from one side of the truck to the other.

18. The invention of claim 10, wherein the lines are attached to the upper carriage by pulleys to provide a mechanical advantage.

19. The invention of claim 10, wherein the controllers of the lifting devices are configured to communicate with a mobile device.

20. The invention of claim 10, wherein the controllers of the lifting devices are configured to communicate with each other.

* * * * *